United States Patent [19] [11] 4,247,069
Kurz [45] Jan. 27, 1981

[54] CAMERA TRIPODS MOUNTING

[76] Inventor: Gerd Kurz, 7308 Joliette Crescent, Mississauga, Ontario, Canada

[21] Appl. No.: 28,986

[22] Filed: Apr. 11, 1979

[30] Foreign Application Priority Data

May 5, 1978 [CA] Canada .................................. 302762

[51] Int. Cl.$^2$ .......................................... F16M 11/10
[52] U.S. Cl. .................................... 248/185; 248/636; 248/183
[58] Field of Search ............... 248/185, 177, 178, 179, 248/183, 186, 636, 278; 188/71.5, 72.8, 73.2

[56] References Cited

U.S. PATENT DOCUMENTS

| 1,425,807 | 8/1922 | Thalhammer | 248/183 |
| 1,898,469 | 2/1933 | Tonsor | 352/243 X |
| 2,532,122 | 11/1950 | Schroeder | 248/183 |
| 2,882,001 | 4/1959 | Ries et al. | 248/183 |
| 3,123,330 | 3/1964 | Robinson | 248/183 |
| 3,180,603 | 4/1965 | O'Connor | 248/183 |
| 3,353,776 | 11/1967 | Clemens | 248/183 |
| 3,552,699 | 1/1971 | Baker | 248/183 |
| 4,010,923 | 3/1977 | Miller | 248/183 |
| 4,083,524 | 4/1968 | O'Connor | 248/183 |
| 4,113,215 | 9/1978 | Stapleton | 248/183 |

FOREIGN PATENT DOCUMENTS

| 1097268 | 1/1961 | Fed. Rep. of Germany | 248/186 |
| 1167545 | 4/1964 | Fed. Rep. of Germany | 248/177 |
| 1105677 | 12/1955 | France | 248/186 |
| 91454 | 9/1953 | Norway | 188/72 |
| 244085 | 8/1946 | Switzerland | 248/177 |
| 625643 | 6/1949 | United Kingdom | 248/177 |

Primary Examiner—J. Franklin Foss
Attorney, Agent, or Firm—Zarley, McKee, Thomte, Voorhees & Sease

[57] ABSTRACT

An improved camera tripod with a pan-head is presented in which the pivotal motion of the camera is controlled by friction resistance means which incorporate a rotor ring and at least one co-operating stator ring mounted on an axle so that the rotor keyed to the camera mounting platform rotates with it, and rotates relative to the stator which is fixed by key means to the non-pivoting part of the tripod. The rotor and stator have on their opposing faces a ring of ridges on one and a ring of grooves on the other which mate and touch at tapered sides thereof. Friction is increased by screw means on the axle which compress the rotor and stator together. The motion is made smoother by porous padding impregnated with lubricant of a viscous fluid between the contacting surfaces of the rotor and stator. The rotor and stator are loosely mounted on the axle to allow them to float somewhat and achieve their mutual alignment.

10 Claims, 3 Drawing Figures

CAMERA TRIPODS MOUNTING

This invention relates to improvements in camera tripods. In particular, it relates to improvements in pivotable or rotatable mounting mechanisms for tripods as might be used to support motion picture cameras of the cinema or television type.

Of course, tripods have been used for many years to support and provide a steady mounting for cameras. For still cameras all that is needed is some mechanism for fastening the camera to the top of the tripod, and perhaps an adjustable mechanism which will allow adjustment of the direction in which the camera is pointed. However, for cinema and television cameras it is necessary to provide a mechanism, known as and herein referred to as a "pan-head" in conjunction with the conventional three legs of a tripod which will allow the camera to be mounted for support by the tripod, but will also allow the camera to be pivoted and swung so that it can follow the action of a sports event or sweep across the surrounding scene.

For most uses the motion camera, by which term it is generally intended to encompass cinema and television type cameras in which continuous action and movement is continuously recorded (as opposed to a still camera which takes a single picture of a single scene), requires movement about two axes. A vertical axis of rotation will allow the camera to be swung in a horizontal plane, and a horizontal axis will allow the camera to be aimed up or down in a vertical plane. Of course, a combination of the two motions will allow the camera to follow a great variety of paths. Rarely will the camera ever be required to rotate about an axis parallel to its line of vision, and therefore the following description will deal with a more conventional mechanism.

It should be kept in mind that television and cinema cameras are often very heavy, and therefore a tripod must present not only a strong and rigid base but a smooth and easy pivoting mechanism in the pan-head. It is not merely sufficient to allow pivoting of the camera but the motion must be, in order to obtain the best possible results and the least disturbing reaction for the viewing audience, a fairly smooth and continuous movement without sudden acceleration, stopping, or any jerky movement which would tend to blur the picture being produced or transmitted. To achieve this result it is necessary to provide a mechanism which can be moved without exerting excessive force and yet one which will not move too easily in response to the cameraman's movement as he changes direction or speed of the movement of the camera as it is pivoted to follow the action.

Although previous tripods have been designed with mechanisms designed to control and regulate the pivoting motion of the pan-head, most of them have results in a jerky, less fluid movement of the camera and with adjusting means which are too abrupt in their activation and not sufficiently gradual in the adjustment of the resistance provided to the cameraman's motion. Still others have provided mechanisms which act in the nature of a break, but put too much radial or off-centre pressure on the pivoting mechanism, thus causing uneven motion and excessive and premature wear on bearings and moving parts which later results in looseness and poor performance.

It is therefore the object of this invention to provide a tripod with a pan-head which allow pivoting of a motion camera about one or more axes with an easy but smooth and continuous motion.

It is a further object of this invention to provide a tripod in which the pivoting action of the pan-head may be adjustable to provide either a very easy motion, or a very stiff slow motion, or even to allow the mechanism to be clamped in a fixed position.

It is a further object of this invention to provide a pan-head mechanism in which the resistance or clamping action of the mechanism designed to resist or control the pivoting motion will be self-contained and not put excessive strain and wear on bearings and other such moving parts.

I have found that these objects and other advantages can be achieved by means of a camera tripod with a pan-head adapted to pivot a camera relative to the tripod about an axis of rotation in which an axle is mounted coaxial with the axis of rotation on the tripod pan-head, and a camera mounting means is pivotally mounted on the axle for rotation about the said axis. Means for controlling the pivotal motion by a frictional resistance includes a rotor ring mounted on the axle concentric therewith, and being fixed to pivot with the pivotal mounting means. At least one stator ring is mounted on the axle coaxial therewith and extends radially substantially coextensive with the rotor ring, the stator ring being rotationally fixed relative to said tripod so that any pivoting of the pan-head camera mounting will result in relative rotational movement between the rotor and stator. Further means are provided to exert compressive pressure between the rotor and stator to effect frictional resistance to relative rotational movement between them. On the adjacent faces of the rotor and stator are respectively a set of at least one circular raised ridges on one, and on the other a corresponding circular groove adapted to receive the ridge thereinto. The ridge and grooves have tapered side walls which act as the surfaces of contact and provide the frictional resistance to rotational movement. The frictional resistance is made smoother by the use of a lubricating material between the tapered surfaces, and this lubrication is assisted further by a pad of porous material capable of impregnation by the lubricating material which may be in the nature of a viscous fluid such as silicone or perhaps graphite. As an additional feature, the rotor and stator mechanisms may be enclosed in a chamber filled with lubricating material and may additionally have damping veins. The rotor and stator being somewhat loosely mounted on the axle are free to move axially and somewhat radially so that they may achieve mutual parallelism and concentricity. Similar mechanism can be used for both a horizontal and vertical axis of pivoting.

The invention may be better understood by reference to a description of the construction and function of one embodiment thereof with reference to the accompanying drawings in which.

Figure 1:
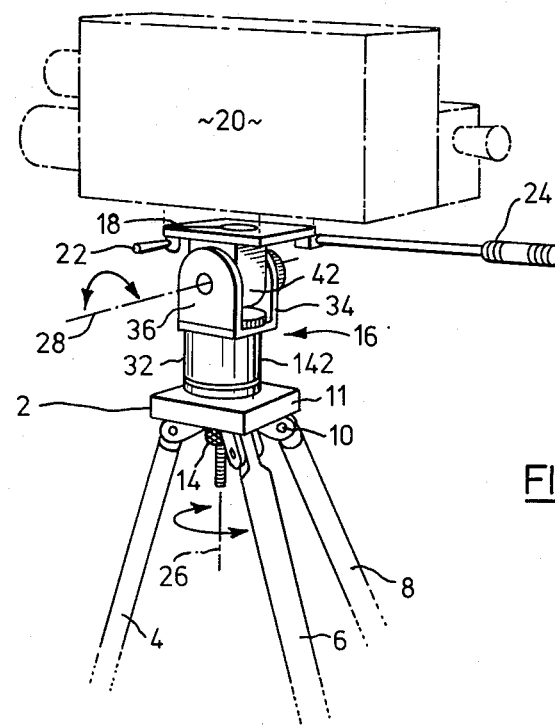
FIG. 1 is a perspective view of a tripod with a pan-head of the present invention showing schematically a camera mounted thereon.

In FIG. 1 is illustrated a tripod 2 having three legs 4, 6 and 8 which are illustrated in simplified form since the nature of this aspect of the tripod is well known to those skilled in the art. In practice, most tripods have legs which are sufficiently sturdy for the purpose and are adjustable as to length to accommodate uneven surfaces or to adjust the height of the camera. The legs are, of course, pivoted about a connection point such as 10 to afford the legs of the tripod directional adjustment as well.

The legs are connected to a plate 11 which has a central aperture therein 12 to allow fastening of a pan-head (or a camera) by means of a bolt and nut, such as illustrated at 14.

The pan-head shown generally at 16 is mounted on top of the tripod plate 11 and affixed thereto, and has a platform 18 to which a camera, illustrated generally at 20, is mounted by means of a camera locking mechanism 22 which might be for instance a bolt extending through the platform 18 to engage a female thread in the bottom of the camera.

To facilitate movement in aiming the camera, the platform is provided with a handle 24 in a position of easy access for the cameraman.

The pan-head 16 is designed to allow pivoting of the camera so that its line of vision can be moved horizontally and vertically, or a combination of both at the same time. Horizontal motion is effected by rotation about the vertical axis 26 and vertical motion is effected by rotation about the horizontal axis 28. Of course, the combination of the two axes will allow for motion in any direction, such as on the diagonal, merely by the operator steering the camera with the aid of the handle 24. Although the pivoting axes of the pan-head will allow for the necessary scope of movement of the camera, it is important that the camera be moved slowly and smoothly without undue acceleration or sudden stopping or any jerky movement. It is also important that the operator be able to leave the camera unattended without it tilting over and falling to the ground.

Figure 2:
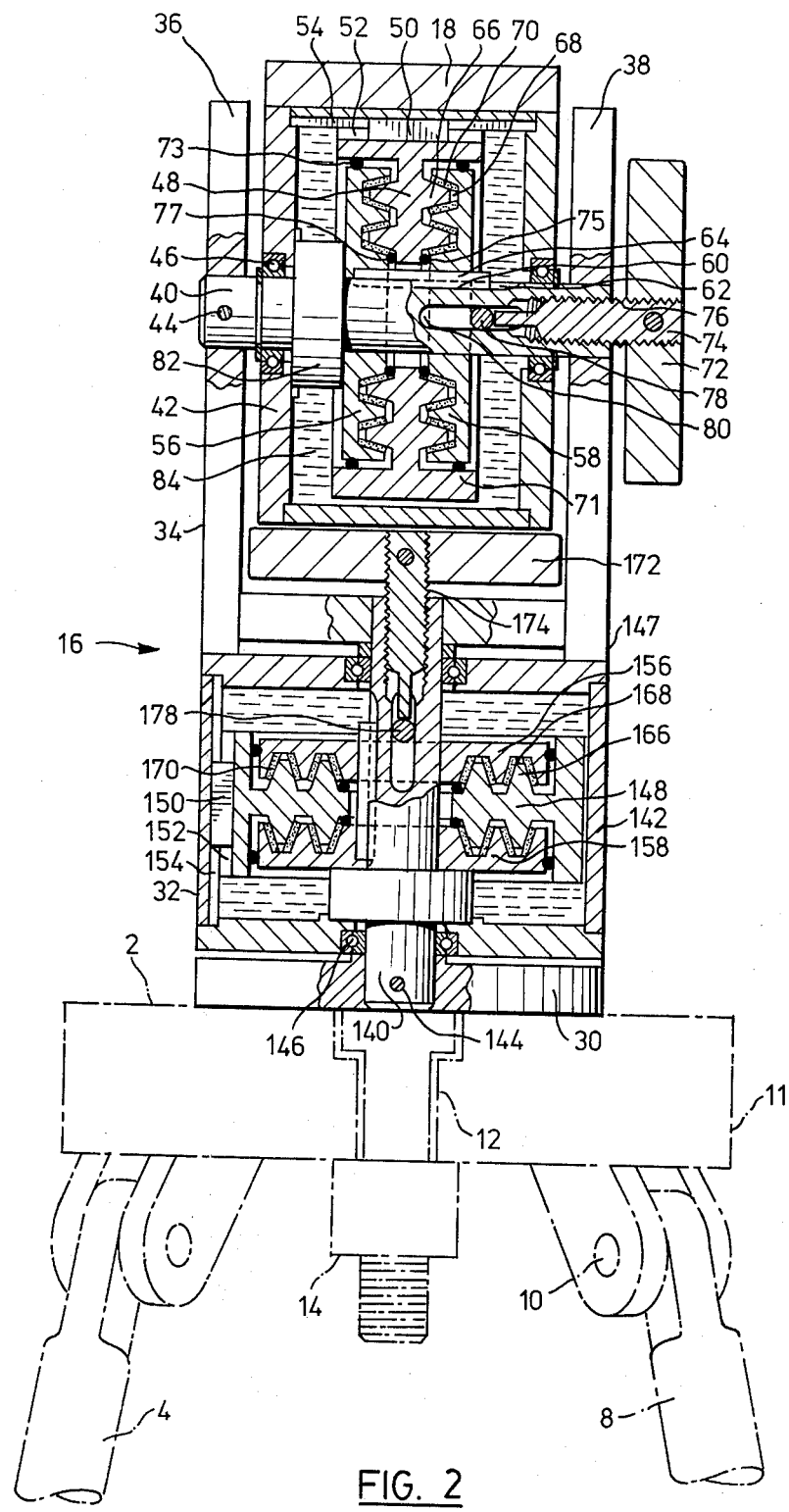
FIG. 2 illustrates a tripod of the present invention in which the pan-head is shown in vertical cross section.

To this end the present mechanism provides means for adjustable resistance best illustrated in the cross sectional view of FIG. 2. The pan-head 16 is mounted on the tripod plate 11 by means of a base 30 fixed to the plate 11 by means of the bolt and nut 14, as previously referred to in FIG. 1.

The lower housing 32 contains a mechanism for controlling rotation about the vertical axis 26 and the upper housing 34, which rest on top of the lower housing 32, contains mechanism for controlling vertical rotation about the horizontal axis 28.

In the upper housing side supports 36 and 38 support a horizontal axle 40 on which is mounted between the side plates a chamber 42. The axle is fixed to the side wall 36 against rotation or other movement by the set screw 44. The chamber 42 is mounted to pivot on the said axle by bearing means illustrated at 46, one on each side of the chamber.

The chamber is surmounted on the top by the platform 18 previously mentioned which is designed to allow mounting of the camera to the tripod pan-head.

Mounted within the chamber 42 is a circular rotor ring 48 mounted loosely on the axle 40, substantially coaxial therewith and rotatable with respect thereto. The rotor ring 48 is, however, fixed with respect to rotational movement to the chamber 42 by means of a key 50 which engages a key slot 52 in the outer circumference of the rotor ring, and a key slot 54 in the inner circumference of the chamber. This key means provides that the chamber and rotor ring must rotate together but the key slot and the loose mounting of the rotor on the axle allow some floating and freedom of movement of the rotor.

Mounted on either side of the rotor ring, in the illustrated embodiment, within the chamber, are a pair of stator rings 56 and 58 respectively, which are also mounted loosely on the axle 40, but are fixed against rotation relative to the axle (and therefore the rest of the housing pan-head and tripod) by a key 60 which engages a key slot 62 in the outer circumference of the axle 40, and a key slot 64 in the inner bore of the stator ring. These rings are also allowed to float with some freedom of movement by virtue of the keyways and the loose mounting on the axle.

The rotor ring has on the sides thereof circular ridges (two in the illustrated embodiments) 66, concentric with the axle 40, which mate with corresponding grooves 68 in the adjacent sides of the stator rings. The sides of the ridges and the corresponding grooves are tapered in a sort of truncated pyramid configuration with the sides of the ridges substantially parallel to the sides of the grooves. The ridges and grooves are so dimensioned that the tapered sides thereof will constitute the points of contact if the rotors and stators are pressed together.

Between the sides of the ridges and the corresponding sides of the grooves is a pad of porous material 70 such as cork, felt, perforated plastics such as teflon, or the like which provides a sort of buffer between the two tapered sides of the ridges of the rotor and the grooves of the stator, the rotor and stator being ideally made of metals. These pads provide lubrication and might conceivably be made of other types of materials such as sintered metal, but it is the main purpose to provide a porous entrapment for lubricating materials such as a viscous fluid like silicone or powdered graphite or even heavy oils.

When the chamber 42 and its camera platform 18 are rotated about the horizontal axis 28, the rotor ring will rotate with the chamber relative to the stator rings which are fixed to the axle, and the friction of their relative movement will resist rotation of the camera about the horizontal axis. To enable adjustment of the friction resistance, the pan-head is provided with a horizontal axis adjusting knob 72 on a threaded stem 74 which is mounted by female threads to a bore 76 in the centre of the axle. A bar 78 extends through a slot 80 in the axle and rests against the side of one of the stator rings. The other stator ring is held on its outboard side by a collar 82 on the axle 40 which forms a stop against the outboard side of the stator 56.

Thus, it will be seen that when the adjustment knob 72 is turned clockwise, it will cause the shaft 74 to press against the bar 78 forcing the stator ring 58 against the rotor ring 48, causing the latter to be squeezed between the two stator rings 58 and 56 increasing the friction of the relative rotation between them. If tightened enough the rotor and stator rings will become effectively clamped together to prevent the camera from tilting at all.

Since it is not desirable merely to create friction in resistance to rotation but to create a smooth relative motion, it is desirable to lubricate the mechanism with a lubricant such as a viscous fluid like silicone, a heavy oil or a dry lubricant such as graphite etc. The pad 70 being a porous material will tend to entrap quantities of the lubricating material so as to keep the tapered surfaces of the grooves and ridges lubricated. Ideally, the lubricant, should maintain a constant viscosity in warm or cold conditions and in this respect silicones are quite suitable.

An abundant supply of the lubricant may be provided by filling the chamber 42 with the desired lubricant material.

Alternatively, lubricant can be sealed in the area of the contact between the rotor and stator by means of O-ring seal illustrated at 71 and 73 on the outer circumference of the stator rings, and at 75 and 77 near the inner bore of the rotor and stator. By use of these seals a more limited quantity of lubricant can be contained in the area of contact between the rotor ridges and the stator grooves.

Filling the chamber 42 with a viscous fluid will enable the use of an additional advantage to this mechanism by providing veins on the chamber and on the stator; the fluid on the chamber will provide a sort of dampening effect which will prevent the camera from tilting quickly if the friction mechanism is released. The veins, however, are not illustrated in the enclosed drawings but could be of any conventionally normal design.

Figure 3:
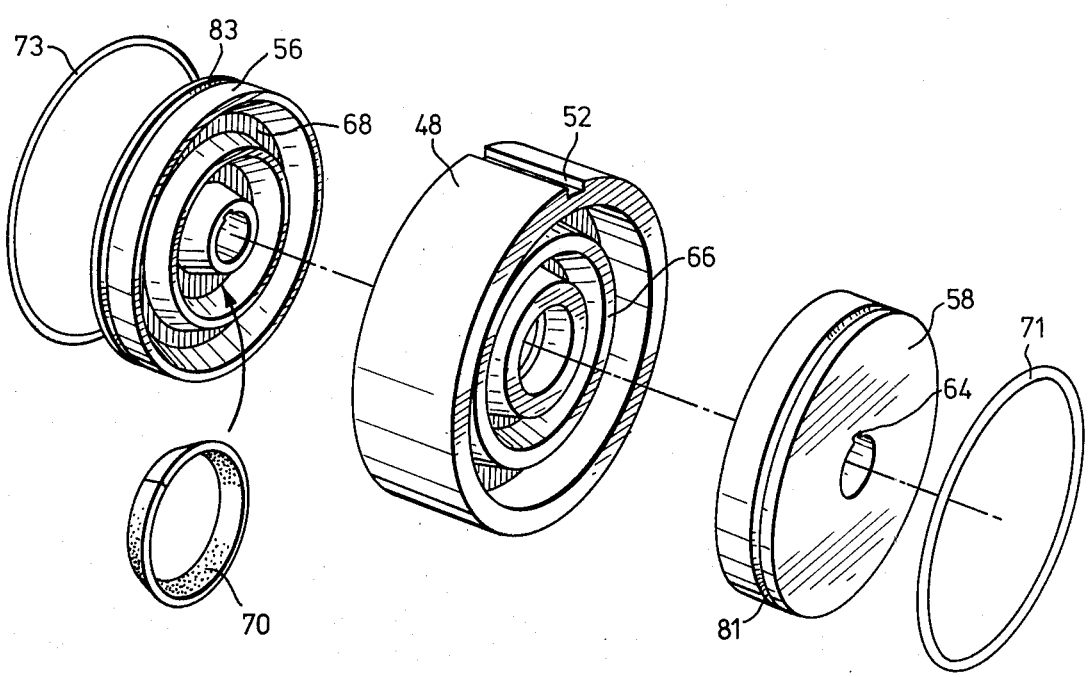
FIG. 3 illustrates an exploded view of some of the elements shown in cross section in FIG. 2.

FIG. 3 is an exploded view illustrating the configuration of the rotor and stators and their co-operative relationship. The O-ring 71 and 73 fit in grooves 81 and 83 respectively in the outer circumference of the stators. For rotation horizontally about the vertical axis, the lower housing 32 contains a mechanism similar to the upper housing but arranged at 90° thereto. A central vertical axle 140 is mounted on the base 30 and fixed by a set screw 144 against movement or rotation. A chamber 142 is mounted for rotation about the axle 140 by means of bearings 146, and have the upper housing 34 mounted on its upper side at 147.

Within the housing a rotor ring 148 is mounted concentrically on the axle and keyed to the housing by key 150 which engages keyways 152 and 154.

Above and below the rotor are a pair of stator rings 156 and 158 having grooves 168 corresponding to ridges 166 in the rotor ring. Porous pads 170 are provided as a buffer between the corresponding tapered sides of the ridges and grooves. A vertical axis adjusting knob 172 provides manual adjustment of the shaft 174 which activates the bar 178 to effect compression of the rotor ring between the two stator rings when the vertical axis adjusting knob is tightened. Thus, in a similar way rotation about the vertical axis may be adjusted by increasing the friction and by providing a viscous fluid or other lubricant to lubricate the relative motion of the rotor and stator, the lubricant being contained within the chamber 142, or otherwise contained between the rotor and stator by O-ring seals similar to those previously described with respect to the upper housing.

It will be seen that by moving the camera horizontally, the upper housing mounted on the chamber of the lower housing will be caused to rotate with the rotor keyed to it, while the stators 156 and 158 will remain stationary keyed to the central axis which is locked to the base 30. For vertical movement the camera will move with the platform 18 and the chamber 42 of the upper housing which is keyed to the rotor 48, which will be caused to move and rotate relative to the stators 56 and 58 which are stationary being keyed to the axle 40 which is fixed to the side walls of the housing 36 and 38.

Tightening of the horizontal axis adjusting knob 72 or the vertical axis adjusting knob 172 will increase the friction and make movement of the camera slower but steadier. Sufficient tightening can create enough friction to lock the rotors and stators together so that the camera will remain in a position unattended.

Because the sides of the ridges of the rotor and the grooves of the stators are tapered, although substantially parallel to each other, they will move towards each other by the tightening mechanism at an angle less than 90° and therefore will not move quickly from a relaxed position to a locked position as they might if the areas of contact were parallel and normal to the direction of compression. They will instead come into contact and tighten more gradually, thus allowing for a more gradual tightening and a greater range of adjustment in the friction between them.

Because the rotor and stators are not tightly fitted to the axle, they are free to float within the restrictions presented by the housing and the keyways and therefore are able to establish their own concentricity and parallelism. The keyways allow the rotors and stators to move within limits and axial directions as the mechanism is tightened or relaxed. Therefore, if the rings or grooves are somewhat out of alignment or out or round, this floating freedom will allow them to accommodate their relative positions and minimize the effect of any inaccuracy and machining of the parts.

Furthermore, the stator 56 is held by the collar 82 of the axle 40 and the rotor and other stator are compressed by the knob 72 and the stem 74, all the forces generated in tightening the friction mechanism are contained internally within the mechanism of the axle, and no external force is applied to the housing 42 or the bearing by which it is mounted on the axle, or to the side walls 36 and 38 of the housing. The same is true of the mechanism on the vertical axis. In this way stress on the bearings and structure and pan-head is kept at a minimal and excessive wear, looseness or poor functioning is minimized.

In the illustrated embodiment the rotor has two circular rings and the stator two corresponding grooves. It will be realized that the number of ridges or grooves is not critical, but two or three grooves will be more effective than a single groove, especially if it is desirable that the single groove not be of large diameter. Although large diameter rings would provide an effective control of rotational moment about the axis, they have a disadvantage, in that they require much larger pan-head. This is heavier and more costly. Furthermore, since the camera sits on the top of the pan-head, movement about an axis at larger radius will tend to have a greater effect on the distance between the camera and the object it is photographing requiring more adjustment of the focus. In other words as a camera on a large radius mechanism is tilted forward, it will also tend to travel a short distance forward and the distance of travel increases with the radius of the mechanism and may adversely affect the focus of the camera.

It will, of course, be realized that numerous modifications and alternations in the detail of the illustrated embodiment might be incorporated without departing from the inventive concept herein.

What I claim as new and desire to protect by Letters Patent of the United States is as follows:

1. In a camera tripod having a pan-head adapted to pivot a camera relative to said tripod about an axis of rotation;

an axle mounted coaxial with said axis of rotation on said tripod pan-head;

camera mounting means pivotally mounted on said axle for rotation about said axis;

means for controlling said pivotal motion by frictional resistance, said means comprising:

a rotor mounted on said axle substantially coaxial therewith and extending radially therefrom, said rotor being fixed to said pivotal mounting means to rotate therewith about said axis;

at least one stator ring mounted on said axle substantially coaxial therewith and extending radially therefrom substantially coextensive with said rotor, said stator being restricted against rotational movement about said axis relative to said tripod;

said rotor and stator having on the adjacent sides thereof respectively at least one circular raised ridge on one and a corresponding circular groove adapted to receive said ridge thereinto on the other;

said ridge having tapered truncated sides and said grooves having tapered sides substantially parallel to said ridge sides, whereby said tapered sides and said ridges and said grooves are the surfaces of contact between said rotor and stator;

means adapted to exert compressive pressure between said rotor and said stator to effect frictional resistance to relative rotational movement between them comprising:

stop means mounted on said axle to one side of said rotor and stator limiting movement of said rotor and stator in that direction, bar means mounted on said axle on the other side of said rotor and stator and adapted to compress said rotor and stator together by screw means threadably mounted on said axle and adapted to urge said bar means towards said rotor and stator in the direction of said stop means to exert compressive pressure between said rotor and stator and effect frictional resistance to relative rotational movement between them.

2. The invention as claimed in claim 1 in which the friction between the surfaces of contact of said rotor and stator are lubricated by a lubricant.

3. The invention as claimed in claim 2 in which a porous pad capable of impregnation by said lubricant is disposed between said tapered surfaces of said ridge and said groove.

4. The invention as claimed in claim 3 in which said rotor and said stator are enclosed in a chamber filled with lubricant.

5. The invention as claimed in claim 4 in which the rotor and stator are mounted loosely on said axle to allow same to reach mutual parallelism and concentricity and are free to move axially towards and apart from each other.

6. The invention as claimed in claim 5 having a stator on each side of said rotor attempted to compress against said rotor between them.

7. The invention as claimed in claim 2 in which a lubricant is maintained in the grooves by seals adapted to seal the area between the rotor and stator sides at the outer circumference thereof and the inner circumference thereof.

8. The invention as claimed in claim 2 in which the pivotal motion about said axis is dampened by stationary veins and rotational veins projecting into said fluid filled chamber.

9. The invention as claimed in claim 1 in which said stop means comprises an upstanding collar on said axle on one side of said rotor and stator combination and said bar means is mounted on said axle by means of a slot axially elongated adapted to allow said bar to extend therethrough.

10. The invention as claimed in claim 1 in which said screw means comprises a screw threadably mounted on an axial bore in the end of said axle opposite said collar, said bore intercepting said elongated slot and adapted to permit said screw to engage said bar and press said bar against said stator and rotor combination in the direction of said collar by rotation of said screw in said threads.

* * * * *